United States Patent [19]

Janiszewski

[11] Patent Number: 5,209,139
[45] Date of Patent: * May 11, 1993

[54] FLYWHEEL FOR AN INTERNAL COMBUSTION ENGINE

[75] Inventor: Grzegorz Janiszewski, Angered, Sweden

[73] Assignee: AB Volvo, Goteborg, Sweden

[*] Notice: The portion of the term of this patent subsequent to Oct. 20, 2009 has been disclaimed.

[21] Appl. No.: 584,244

[22] Filed: Sep. 18, 1990

[30] Foreign Application Priority Data

Sep. 20, 1989 [SE] Sweden .................................. 8903091

[51] Int. Cl.⁵ .............................................. F16F 15/10
[52] U.S. Cl. ........................................ 74/574; 74/572; 464/68; 192/106.2
[58] Field of Search ............... 74/572, 574; 192/106.2, 192/106.1; 464/63, 66, 68

[56] References Cited

U.S. PATENT DOCUMENTS

| | | | |
|---|---|---|---|
| 4,484,898 | 11/1984 | Kohno | 192/106.2 X |
| 4,493,673 | 1/1985 | Anders et al. | 192/106.2 X |
| 4,747,801 | 5/1988 | Chasseguet et al. | 464/66 |
| 4,777,843 | 10/1988 | Bopp | 192/106.2 X |
| 4,782,718 | 11/1988 | Hartig et al. | 74/574 |
| 4,790,792 | 12/1988 | Bopp | 192/106.2 X |
| 4,816,006 | 3/1989 | Friedmann | 464/67 |
| 4,850,244 | 7/1989 | Eckel et al. | 74/574 |
| 4,850,932 | 7/1989 | Kagiyama et al. | 464/68 |
| 4,884,996 | 12/1989 | Schmitt et al. | 192/106.2 X |
| 4,908,003 | 3/1990 | Kobayashi et al. | 192/106.2 X |
| 4,944,712 | 7/1990 | Worner et al. | 74/574 X |
| 4,961,487 | 10/1990 | Langeneckert | 192/106.2 |

FOREIGN PATENT DOCUMENTS

| | | |
|---|---|---|
| 3411091 | 5/1985 | Fed. Rep. of Germany . |
| 3901123 | 8/1989 | Fed. Rep. of Germany . |
| 3919545 | 1/1990 | Fed. Rep. of Germany . |
| 2160296 | 12/1985 | United Kingdom . |
| 2168784 | 6/1986 | United Kingdom . |
| 2198212 | 6/1988 | United Kingdom . |
| 2214610 | 6/1989 | United Kingdom . |
| 2219647 | 12/1989 | United Kingdom . |

Primary Examiner—Carl D. Friedman
Assistant Examiner—Winnie Yip
Attorney, Agent, or Firm—Young & Thompson

[57] ABSTRACT

Flywheel device for internal combustion engines. The device has a first flywheel mass (1) intended to be connected to the engine crankshaft, and a second mass (2) with a frictional surface (12) designed to carry a clutch cover with associated pressure plate. Torque is transmitted between the masses via springs (40) laid in channels (17) and fingers (5,6,18). Characteristic for the invention is that a third mass (3) separated from the first and second masses is in engagement with the springs (40) to balance centrifugal and reaction forces acting thereon.

4 Claims, 3 Drawing Sheets

FLYWHEEL FOR AN INTERNAL COMBUSTION ENGINE

FIELD OF THE INVENTION

The present invention relates to a flywheel device for internal combustion engines, comprising a first flywheel mass intended to be connected to an output shaft from the engine, a second flywheel mass intended to be coupled via a friction clutch to an input shaft of a transmission, and spring means acting between said masses for transmitting torques between said masses.

BACKGROUND OF THE INVENTION

In designing the drive chain for a passenger car with a manual transmission, in recent years greater attention has been paid to the problem of damping transmission noise such as rapping at idle and rattle. Rapping at idle occurs when the car is stationary and the engine is idling, while rattle occurs when the car is driven and the drive chain is loaded. Both are caused by the fact that the harmonic torque of the engine gives rise to a torsional oscillation cycle in the gearbox when the primary shaft of the gearbox is subjected to an angular acceleration by the primary shaft gear and its input shaft is then retarded by the engine and by the drag torque of the gearbox.

DESCRIPTION OF THE RELATED ART

A known method of dampening rapping at idle and rattle is to reduce these torsional oscillations by dividing the engine flywheel into two masses with an intermediate torque transmitting spring and damping system. Such a system replaces the spring and damping device arranged in the disc center of a conventional clutch. The double mass flywheel with an intermediate spring system functions as a mechanical "low pass filter" and by suitable dimensioning of the components it can reduce the natural frequency of the torsional oscillations from 40–70 Hz, corresponding to the rpm range at which the engine operates under normal conditions, to about 15 Hz, which lies below the normal idle rpm of the engine.

In a known double mass system functioning according to the principle described, the spring system itself has two different types of springs, lying in series with each other and having different spring characteristics. When idling under absence of torque, torque is transmitted from the weaker to the stronger springs, producing a natural resonance in the system which is significantly below the idle rpm of the engine. When the engine is driving or during engine braking, the weaker springs are completely compressed and the damping during torque transmission is effected entirely by the stronger springs. The natural resonance of the system will then be above the idle frequency but below the frequency of the lowest rpm for the loaded engine. A disadvantage of the known system is, however, poor drivability, because of the fact that the soft springs make the relative rotation between the flywheel masses so great during certain operating conditions that the drive chain will be "stretched" and the driving will be "wobbly".

SUMMARY OF THE INVENTION

The purpose of the present invention is to provide a flywheel device of the type described by way of introduction, which effectively damps rapping at idle and rattle without negatively affecting drivability. This is achieved according to the invention by virtue of the fact that the spring means cooperate with a third mass separate from the two first mentioned masses.

The invention is based on the insight that one can avoid negative effects of drivability if the various spring types arranged in series with each other are replaced by a single type which is relatively long. Relatively long springs of the same type have been shown to be able to damp both rapping at idle and rattle at the same time as maximum torque can be transmitted.

Problems arise, however, in using such springs. These problems must be solved in order to achieve a flywheel system which functions in practice. Thus long springs are affected by the centrifugal and reaction forces in the system in such a way that significant friction impeding the spring movement will arise with excessive wear as a result. By arranging, in accordance with the invention, a third mass which cooperates with the springs, these centrifugal and reaction forces can be balanced . A flywheel system is achieved the resonance of which at idle is significantly lower than the idle rpm of the engine. When the drive chain is loaded, the resonance is below the lowest rpm of the loaded engine.

BRIEF DESCRIPTION OF THE DRAWINGS

The invention will be described in more detail with reference to embodiments shown in the accompanying drawings, where.

DETAILED DESCRIPTION OF THE INVENTION

Figure 1:
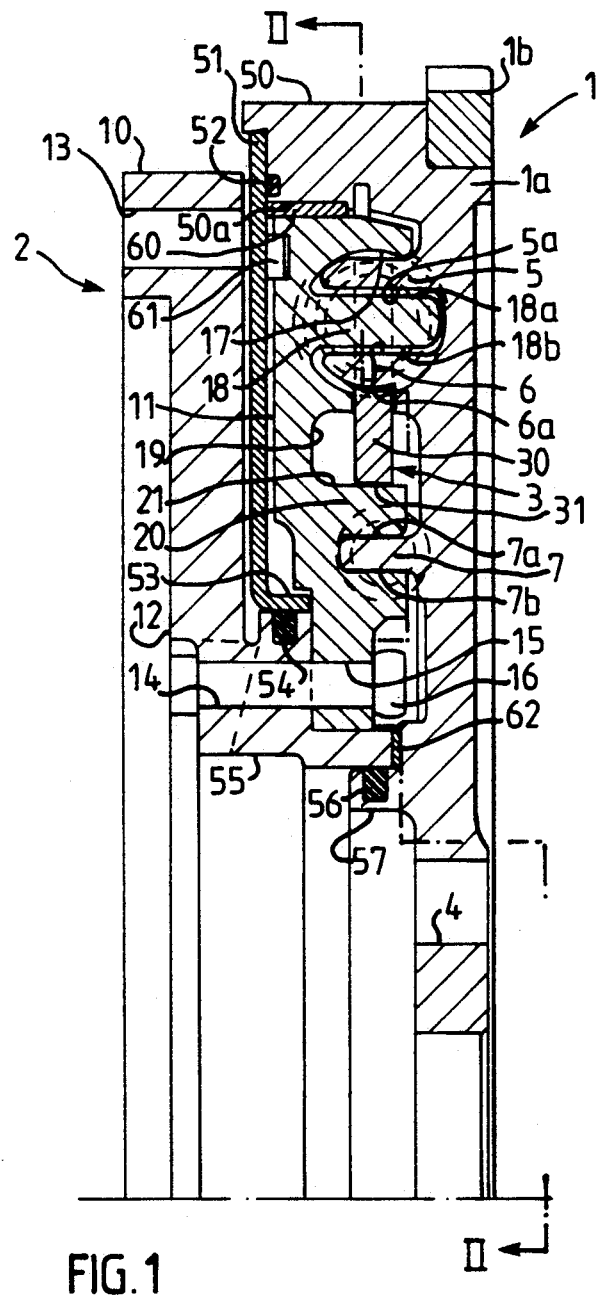
FIG. 1 shows a longitudinal section through a flywheel device according to the invention.

The flywheel device consists of three separate masses, 1, 2, and 3, which are rotatable relative to each other.

The mass 1 is made up of a cast and turned metal disc 1a with a shrunk-on gear rim 1b which is the engine's start rim. A disc 1a is designed to be screwed on to a flange (not shown) on the engine crank shaft end, and for this purpose it has mounting screw holes 4 spaced along a circle. Four pairs of fingers 5 and 6 are spaced at 90° angles, cast in one piece with the disc 1a, said fingers having facing machined surfaces 5a,6a. Radially inside the fingers 5,6 there is a pair of additional fingers 7, placed diametrically opposite to each other. Even the radially inner fingers 7 are cast in one piece with the plate 1a, and they have turned outer surfaces 7c,7b.

The mass 2 consists of a first cast and turned annular metal disc 10, forming a friction plate for a clutch, and a second cast and turned metal ring 11, forming a spring holder. The disc has a faced friction surface 12 for the clutch disc (not shown) and is provided in the vicinity of its periphery with screw holes 13 spaced along a circle, by means of which a clutch cover (not shown) with a pressure plate is securely screwed to the disc 10. In the vicinity of its inner periphery the disc 10 has holes 14 spaced along a circle.

The ring 11 has corresponding holes 15 and is fixed to the disc 10 by means of rivets 16 in the holes 14,15. The ring 11 is cast with a circular, essentially U-shaped channel 17, and with four fingers 18 projecting from the bottom of the channel, said fingers being displaced 90° from each other and oriented relative to the fingers 5,6 of the mass 1 so that each of said fingers 18 in a certain relative position of the masses 1 and 2, lies between an individual pair of fingers 5,6. The surface portion 17a,17b of the channel 17 on either side of the fingers 18 are turned as are the lateral surfaces 18a,18b of the fingers 18. The ring 11 is also cast with a circular channel 19 radially inside the channel 17. The portion 20 of the ring 11 radially inside the channel 19 forms a shoulder with a turned circular surface 21, serving as a bearing surface for the third mass 3.

When casting the ring 11 on the second mass 2, there are created as well circular arcuate depressions 22 with an essentially U-shaped cross section and arranged in pairs. Between the depressions 22 in each pair there are circular-arcuate slots 23, into which the inner fingers 7 of the first mass 1 extend.

Figure 2:
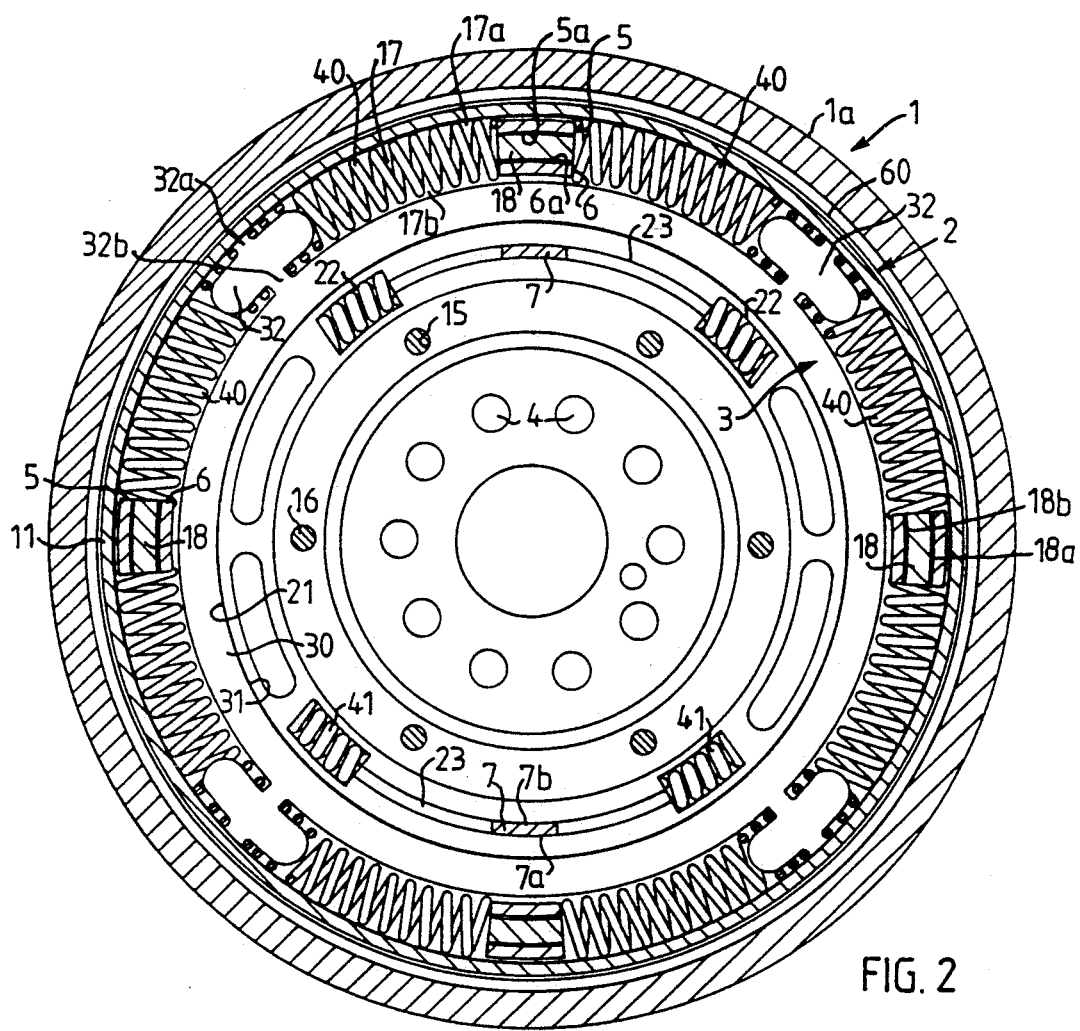
FIG. 2 is a cross section along the line II—II in FIG. 1.

The third mass 3 is formed by a relatively thin metal ring 30, which can be stamped or cut and has a radially inner surface 31 which forms a bearing surface and rests against the surface 21 of the ring 11. The ring 30 is made in one piece with four oblong projections 32 evenly spaced about the periphery and which lie in the channel 17 of the ring 11. These projections have radially outer and inner abutments 32a,32b for one end of helical springs 40 lying in the channel 17. The other end of each spring abuts against the fingers 5,6 and 18, respectively, of the masses 1 and 2, respectively. As can be seen in FIG. 2, the projections 32 are shaped and arranged so that the opposite ends of each projection extend into opposing spring ends, so that when the flywheel device is not subjected to torque, the projections 32 lie midway between pairs of adjacent groups of fingers 5,6 and 18, as shown in FIG. 2. In each channel portion 17 between two groups of fingers, there lie, in the example shown, two helical springs 40, which are held together by the third mass 3 serving as a spring guide or holder. By virtue of the fact that the third mass is rotatable relative to the two other masses 1 and 2, it is able—if there is a relative movement between the fingers 5 and 6 and the finger 18 and a compression of the springs—to rotate freely so much as is needed to allow each pair of springs 40 between the finger groups to function as a single long continuous spring. This achieves the damping characteristics described in the introduction. At the same time the projections 32 on the ring 30 function as guides which compensate for the centrifugal and reaction forces acting on the springs, so that the spring system in this respect has the same characteristics as a system with a distance between the finger groups which is only half as large. Instead of arranging the springs 40 in pairs, spring which are twice as long can be used but which are brought, in a suitable manner, into engagement in the middle with the respective projection 32.

The disc 1a of the mass 1 is made with depressions (not shown) which supplement the channel 17 and the depressions 22 in such a way that essentially closed cavities are formed, essentially circular in cross section for the springs 40 and the springs 41. The purpose of the latter is, by cooperation with the inner fingers 7, to damp impact when there is an extreme overloading of the system. The cavities defined by the disc 1a and the ring 11 are filled with a medium having lubricating and damping properties. The disc 1a is machined so that a flange 50 is formed which extends axially over the ring 11. A cover plate 51 is fixed to the end of said flange 50 with a seal 52 therebetween. The cover plate 51 has an inner flange 53 abutting against a seal 54 in a groove in a flange portion 55 of the disc 10. A further seal 56 in a groove in a radially inner flange 57 on the disc 1a completes the sealing-off of the cavities with respect to the surroundings.

Between the inner surface 50a of the flange 50 and an opposing radial surface of the ring 11, there is a radial bearing 60 in the form av a teflon ring for example. Axial forces in the system are taken up by a thrust-bearing 61 between the cover plate 51 and the ring 11 and a more central thrust-bearing 62 between the disc 1a and an end surface on the flange portion 55 of the disc 10. As an alternative to the outer radial bearing, an inner anti-friction bearing (not shown) can be used. It is, however, more advantageous to place the bearing at a greater radial distance from the axis of rotation since deflections of the engine crank shaft will then produce smaller deviations and less stress on the bearing.

Figure 4:
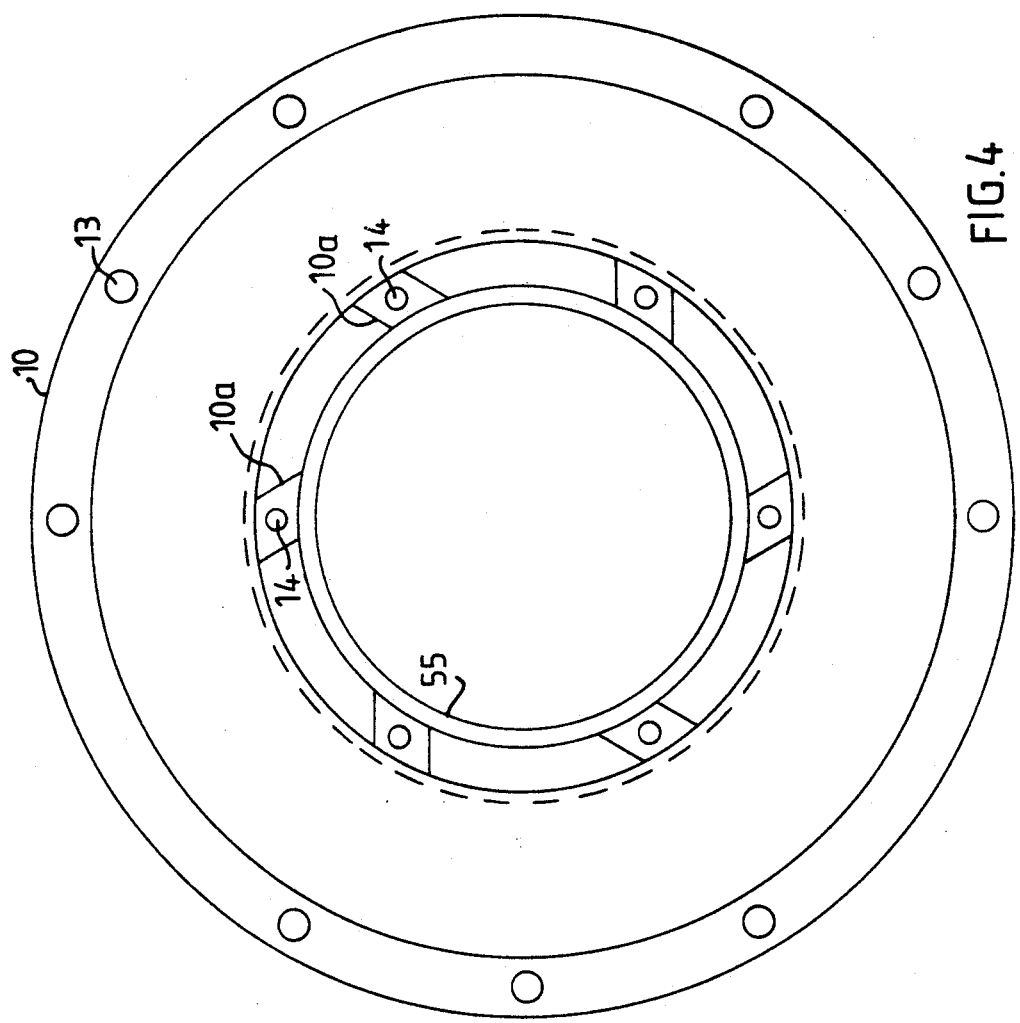
FIG. 4 is a plan view of the portion shown in FIG. 3.
Figure 3:
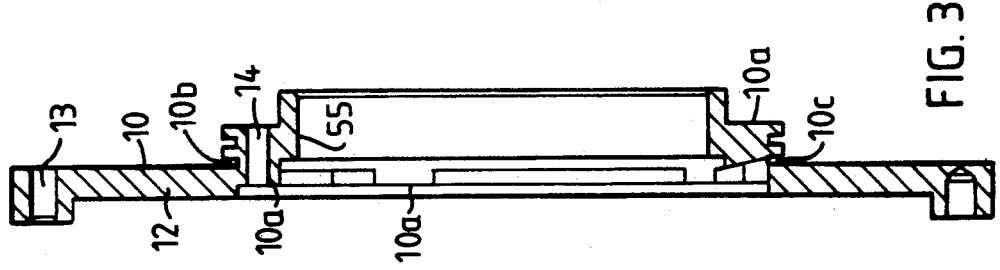
FIG. 3 is a longitudinal section through a portion of the flywheel masses in a modified embodiment.

FIGS. 3 and 4 show in a somewhat modified form the disc 10, serving as a friction plate of the second mass. The radially inner flange portion 55 and the portion of the disc on which the frictional surface 12 is located, are joined to each other at the bridges 10a made during the casting of the disc 10. A groove 10b is cut into the disc 10 after casting, so that thru-slots 10c are formed between the bridges 10a. One thereby reduces the mass which can conduct heat generated when the clutch slips from the frictional surface 12 to the cavities in the system containing the lubricating and damping agent. At the same time the slots 10c form passages through which cooling air can pass. The bridges 10a are also made with oblique surfaces as is revealed in FIG. 4 which serve to create, as the disc rotates, a radially outwardly directed airflow.

The embodiment described above is a flywheel device which effectively damps both rapping at idle and rattle during driving. All the components forming the flywheel masses 1, 2 and 3 and their fingers cooperating with the springs, can be made by casting without any machining other than turning in a lathe, and thus costly milling is avoided. The flywheel device according to the invention has proved capable, with the same clutch dimensions, of transmitting greater torque than previously known two-mass flywheels.

I claim:

1. Flywheel device for internal combustion engines comprising a first flywheel mass, a second flywheel mass and spring means acting between said masses for transmitting torque between said masses, said first mass (1) having in the vicinity of its outer periphery a flange portion (50) radially outward of said spring means and axially projecting over at least a portion of the second mass, said flange portion (50) being so dimensioned that a gap is formed between an inner cylindrical surface (50a) on said flange portion and an outer cylindrical surface on the second mass (2), said gap having bearing means (60) disposed therein.

2. Device according to claim 1, wherein the first and second masses (1, 2) define together at least one circular cavity (17) curved in the rotational path of the masses in which spring means are disposed, said cavity being sealed-off and filled with a medium having lubricating and damping properties.

3. Device according to claim 2, wherein a cover plate (51) is fixed to the first mass, said cover plate having an inner portion (53) abutting against a seal (54) supported by a radially inner flange (57) on the second mass (2).

4. Flywheel device for internal combustion engines comprising a first flywheel mass, a second flywheel mass and spring means acting between said masses for transmitting torque between said masses, said first mass (1) having in the vicinity of its outer periphery a flange portion (50) radially outward of said spring means and axially projecting over at least a portion of the second mass, said flange portion (50) being so dimensioned that a gap is formed between an inner cylindrical surface (50a) on said flange portion and an outer cylindrical surface on the second mass (2), said gap having a radial bearing ring disposed therein, and separate thrust-bearing means (61, 62) disposed between opposite radial surfaces of the first and second masses.

* * * * *